(12) United States Patent
Sharma et al.

(10) Patent No.: US 10,079,756 B1
(45) Date of Patent: Sep. 18, 2018

(54) CONSERVING MEMORY RESOURCES OF A PROVIDER EDGE DEVICE IN AN ETHERNET TREE

(71) Applicant: Juniper Networks, Inc., Sunnyvale, CA (US)

(72) Inventors: Manoj Sharma, Cupertino, CA (US); Poorna Pushkala Balasubramanian, Chelmsford, MA (US); Nitin Singh, Fremont, CA (US); Xiaomin Wu, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 150 days.

(21) Appl. No.: 15/072,601

(22) Filed: Mar. 17, 2016

(51) Int. Cl.
*H04L 12/753* (2013.01)
*H04L 12/743* (2013.01)

(52) U.S. Cl.
CPC .......... *H04L 45/48* (2013.01); *H04L 45/7453* (2013.01)

(58) Field of Classification Search
None
See application file for complete search history.

(56) References Cited

U.S. PATENT DOCUMENTS

| 8,611,347 B2 * | 12/2013 | Gupta | H04L 45/16 370/390 |
| 2011/0145394 A1 * | 6/2011 | Krzanowski | H04L 12/4625 709/224 |
| 2015/0095207 A1 * | 4/2015 | Kodde | G06Q 40/04 705/37 |
| 2017/0257311 A1 * | 9/2017 | Sharma | H04L 12/4641 |

OTHER PUBLICATIONS

Sajassi et al., "E-TREE Support in EVPN & PBB-EVPN," https://tools.ietf.org/html/draft-ietf-bess-evpn-etree-03#page-4, Oct. 10, 2015, 32 pages.

* cited by examiner

*Primary Examiner* — Xavier Szewai Wong
(74) *Attorney, Agent, or Firm* — Harrity & Harrity, LLP

(57) ABSTRACT

A provider edge device, capable of accessing a first type of memory and a second type of memory, may determine a network address associated with a customer edge device. The provider edge device may determine whether the customer edge device is categorized as a leaf device in an Ethernet Tree service provided by the provider edge device. The provider edge device may selectively store the network address in the first type of memory or the second type of memory based on determining whether the customer edge device is categorized as a leaf device in the Ethernet Tree service.

20 Claims, 7 Drawing Sheets

CONSERVING MEMORY RESOURCES OF A PROVIDER EDGE DEVICE IN AN ETHERNET TREE

BACKGROUND

A router may refer to a network device that routes and/or forwards packets between computer networks and/or network devices. A packet is typically forwarded from one router to another through the networks that constitute the Internet until the packet reaches a destination device. When a packet is received by a router, the router may read address information included in the packet to determine the destination for the packet. Then, using information stored in a routing table or indicated by a routing policy, the router may direct the packet toward the destination.

SUMMARY

According to some possible implementations, a provider edge device may include low latency memory, high latency memory, and one or more processors. The one or more processors may receive route information associated with a remote customer edge device. The route information may include a network address associated with the remote customer edge device. The one or more processors may determine whether a tree node type indicator, associated with the remote customer edge device, indicates that the remote customer edge device is categorized as a leaf device in an Ethernet Tree service provided by the provider edge device. The one or more processors may selectively store the route information in the low latency memory or the high latency memory based on determining whether the tree node type indicator indicates that the remote customer edge device is categorized as a leaf device in the Ethernet Tree service.

According to some possible implementations, a non-transitory computer-readable medium may store one or more instructions that, when executed by one or more processors of a first network device, cause the one or more processors to receive route information associated with a second network device. The second network device may not be directly served by the first network device. The one or more instructions may cause the one or more processors to determine whether the second network device is categorized as a leaf device in an Ethernet Tree service. The first network device may be associated with providing the Ethernet Tree service. The one or more instructions may cause the one or more processors to selectively store the route information in a first type of memory or a second type of memory based on determining whether the second network device is categorized as a leaf device in the Ethernet Tree service.

According to some possible implementations, a method may include determining, by a provider edge device capable of accessing a first type of memory and a second type of memory, a network address associated with a customer edge device. The method may include determining, by the provider edge device, whether the customer edge device is categorized as a leaf device in an Ethernet Tree service provided by the provider edge device. The method may include selectively storing, by the provider edge device, the network address in the first type of memory or the second type of memory based on determining whether the customer edge device is categorized as a leaf device in the Ethernet Tree service.

DETAILED DESCRIPTION

The following detailed description of example implementations refers to the accompanying drawings. The same reference numbers in different drawings may identify the same or similar elements.

A Layer 2 Virtual Private Network (VPN) or Ethernet VPN may be provisioned by a provider to provide point-to-multipoint (e.g., multicast or broadcast) connectivity between devices. An Ethernet VPN may include customer devices (e.g., customer edge routers located on a customer premises) and provider edge devices (e.g., provider edge routers located on the edge of a provider's core network). A customer device may communicate with a provider edge device via an Ethernet interface (e.g., a User-Network Interface (UNI) or an attachment circuit (AC)) to provide connectivity between a customer's local area network (LAN) and the provider's core network.

An Ethernet VPN service may be provided as an Ethernet Tree (E-Tree), which may refer to a rooted multipoint service where an interface between a customer device and a provider edge device is categorized as a root interface or a leaf interface. The Ethernet Tree service supports root-to-root communications, root-to-leaf communications, and leaf-to-root communications, but prohibits leaf-to-leaf communications to increase security and customer privacy. A tree node type indicator may indicate whether a customer device is categorized as a root device or a leaf device, and may be used to prohibit leaf-to-leaf communications.

In some cases, a provider edge device may be connected to only customer devices categorized as root devices, and may not be connected to any customer devices categorized as leaf devices. In these cases, the provider edge device may not need to perform any processing to prohibit leaf-to-leaf communications because the provider edge device is connected to only root devices. Thus, this provider edge device may conserve low latency memory resources by storing route information for leaf devices, such as network addresses for the leaf devices, in high latency memory. Implementations described herein assist with conserving such memory resources of provider edge devices.

Figure 1A:
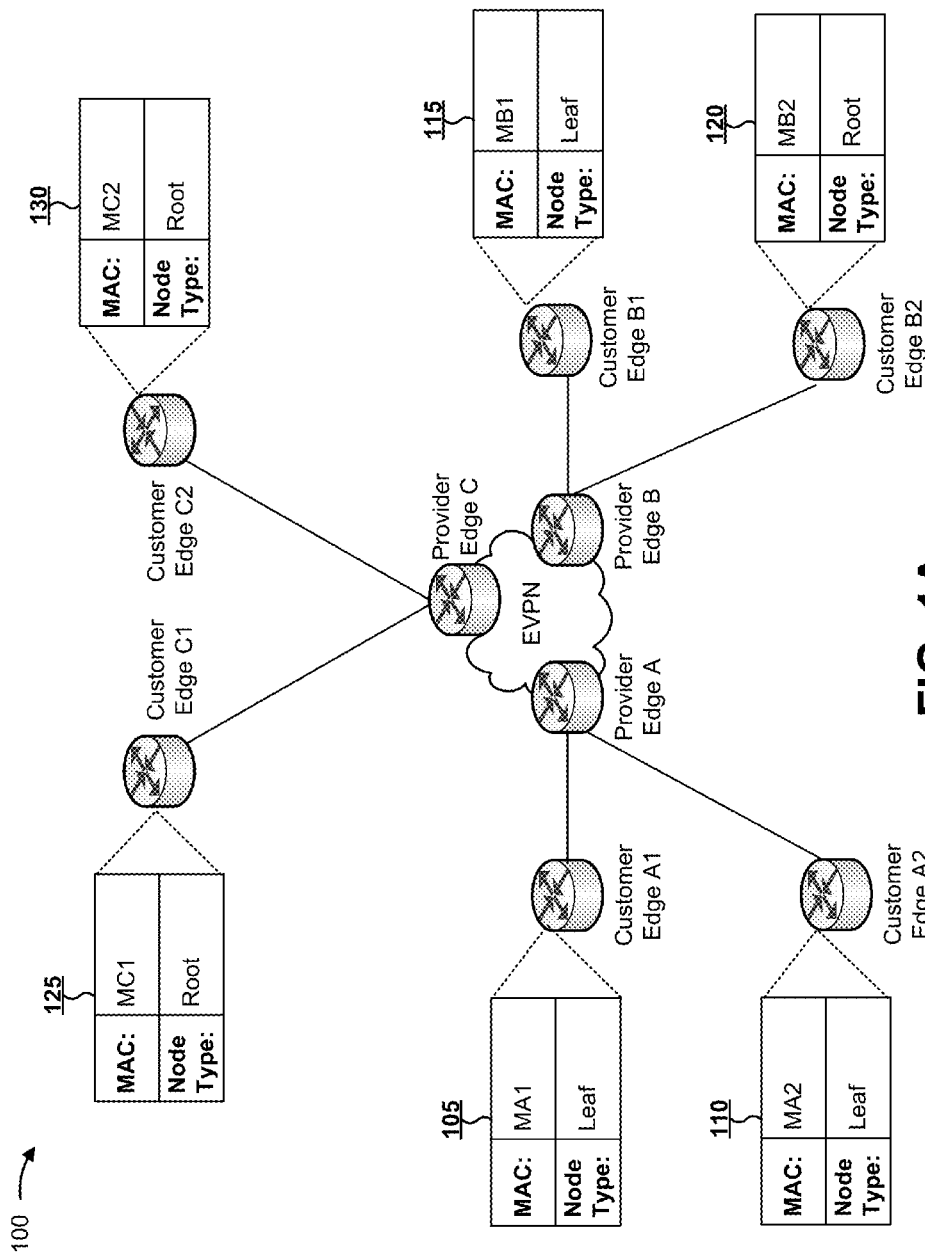
FIGS. 1A-1C are diagrams of an overview of an example implementation described herein.
Figure 1B:
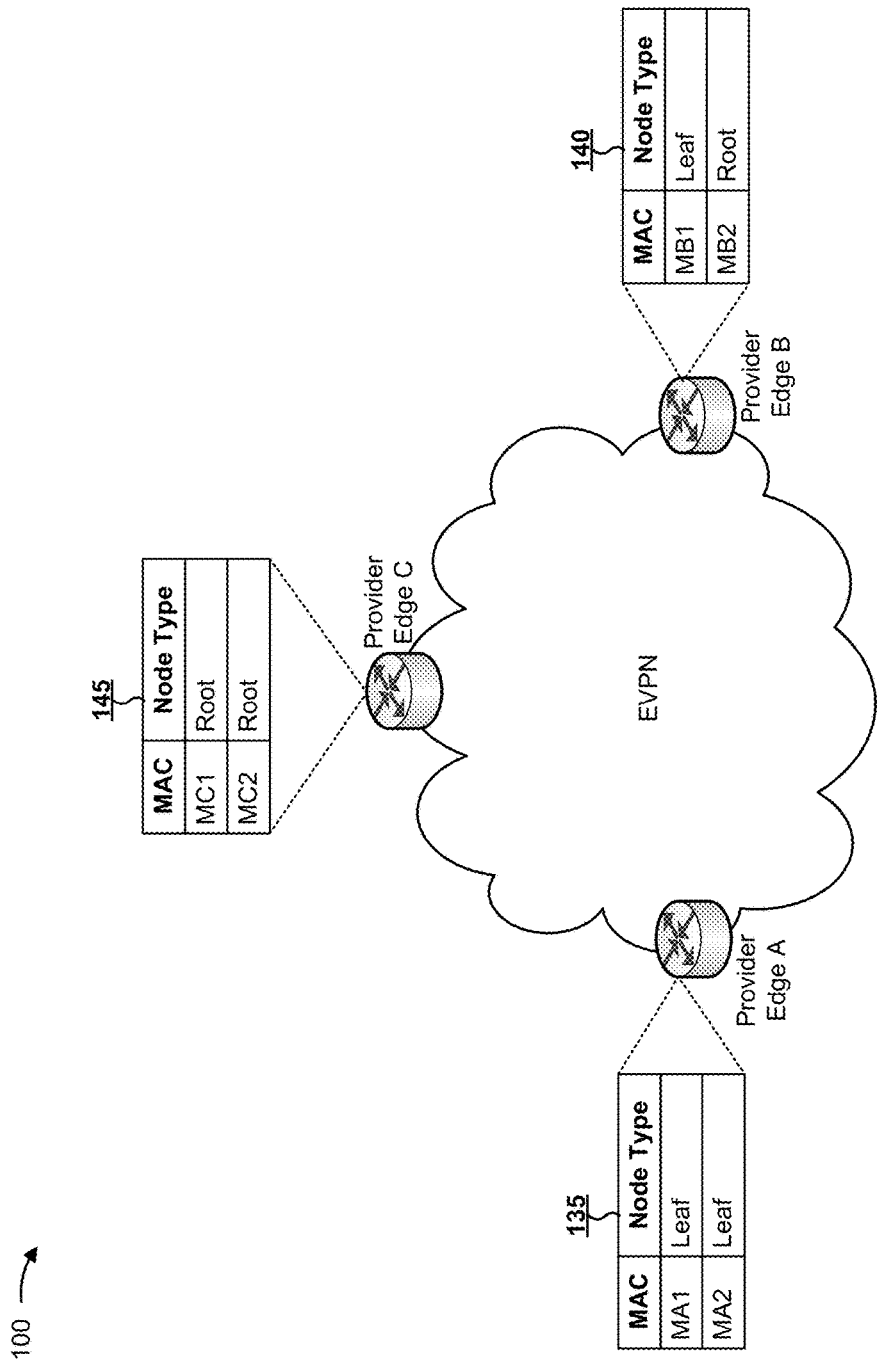
Figure 1C:
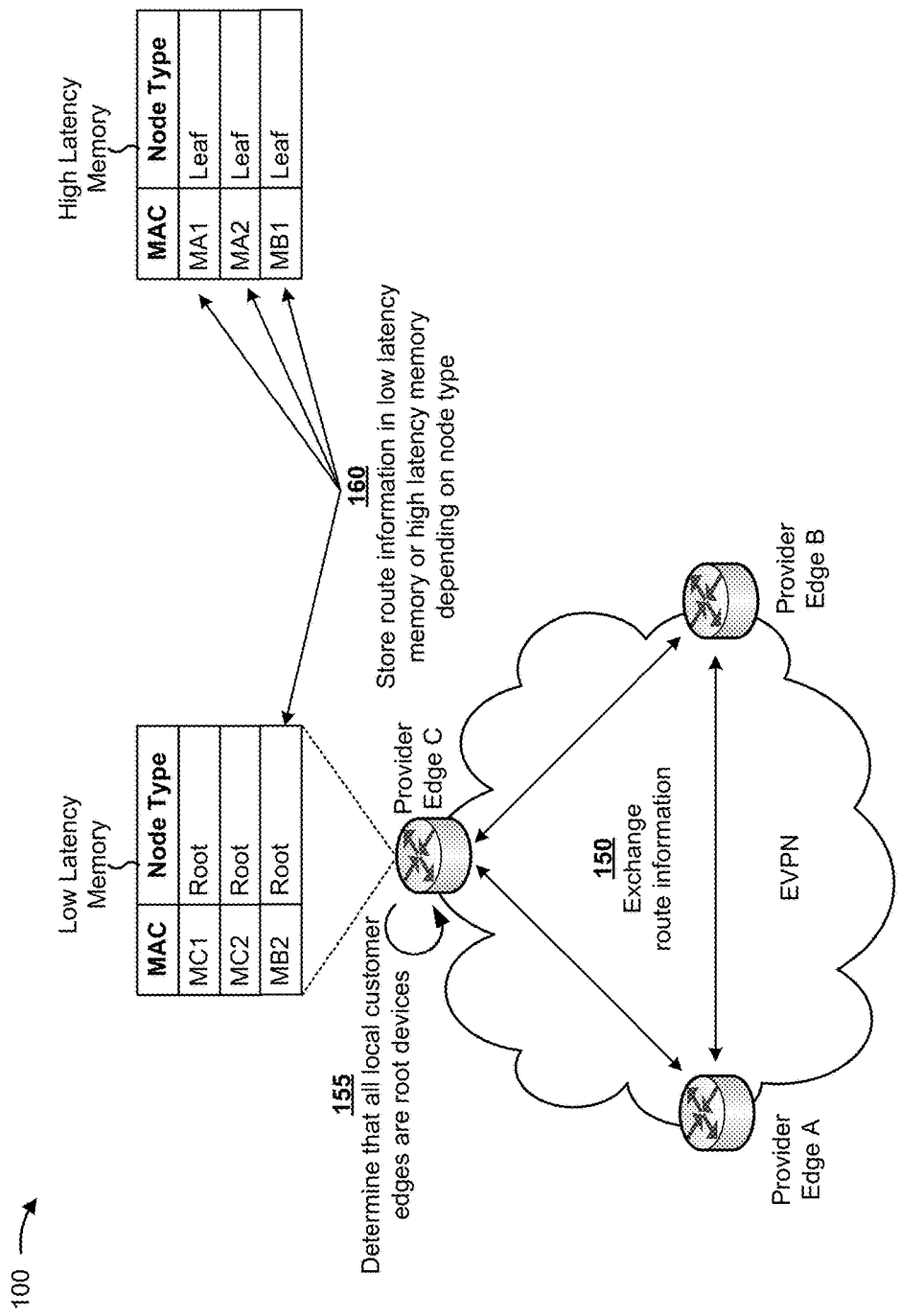

FIGS. 1A-1C are diagrams of an overview of an example implementation 100 described herein. As shown in FIG. 1A, an Ethernet VPN service may be provided as an Ethernet Tree that includes multiple provider edge devices and multiple customer edge devices. For example, assume that a first provider edge device, shown as Provider Edge A, communicates directly with a first customer edge device, shown as Customer Edge A1. Similarly, assume that Provider Edge A communicates directly with a second customer edge device, shown as Customer Edge A2.

As shown by reference number 105, assume that Customer Edge A1 has a media access control (MAC) address of MA1 and is categorized as a leaf device. As shown by reference number 110, assume that Customer Edge A2 has a MAC address of MA1 and is categorized as a leaf device. Thus, Provider Edge A communicates directly with (e.g., connects to) only leaf devices.

Further, assume that a second provider edge device, shown as Provider Edge B, communicates directly with a third customer edge device, shown as Customer Edge B1. Similarly, assume that Provider Edge B communicates directly with a fourth customer edge device, shown as Customer Edge B2. As shown by reference number 115, assume that Customer Edge B1 has a MAC address of MB1 and is categorized as a leaf device. As shown by reference number 120, assume that Customer Edge B2 has a MAC address of MB2 and is categorized as a root device. Thus, Provider Edge B communicates directly with (e.g., connects to) at least one leaf device and at least one root device.

Finally, assume that a third provider edge device, shown as Provider Edge C, communicates directly with a fifth customer edge device, shown as Customer Edge C1. Similarly, assume that Provider Edge C communicates directly with a sixth customer edge device, shown as Customer Edge C2. As shown by reference number 125, assume that Customer Edge C1 has a MAC address of MC1 and is categorized as a root device. As shown by reference number 130, assume that Customer Edge C2 has a MAC address of MC2 and is categorized as a root device. Thus, Provider Edge C communicates directly with (e.g., connects to) only root devices. In some implementations, the customer edge devices may be associated with the same VLAN. In some implementations, the customer edge devices may be associated with different VLANs.

As shown in FIG. 1B, a provider edge device may determine and store route information for local customer edge devices served by the provider edge device (e.g., that communicate directly with the provider edge device). For example, as shown by reference number 135, Provider Edge A may store a MAC address and a tree node type indicator for Customer Edge A1 (shown as MA1 and Leaf) and a MAC address and a tree node type indicator for Customer Edge A2 (shown as MA2 and Leaf). Similarly, as shown by reference number 140, Provider Edge B may store a MAC address and a tree node type indicator for Customer Edge B1 (shown as MB1 and Leaf) and a MAC address and a tree node type indicator for Customer Edge B2 (shown as MB2 and Root). Finally, as shown by reference number 145, Provider Edge C may store a MAC address and a tree node type indicator for Customer Edge C1 (shown as MC1 and Root) and a MAC address and a tree node type indicator for Customer Edge C2 (shown as MC2 and Root).

As shown in FIG. 1C, and by reference number 150, the provider edge devices may exchange route information, and a provider edge device may store route information received from other provider edge devices. In some implementations, a provider edge device that communicates directly with only root devices may store some route information in low latency memory and may store other route information in high latency memory. For example, as shown by reference number 155, Provider Edge C may determine that all local customer edge devices are root devices. Based on this determination, Provider Edge C may store received route information for root devices (e.g., Customer Edge B2 with a MAC address of MB2) in the low latency memory, and/or may store received route information for leaf devices (e.g., Customer Edge A1 with a MAC address of MA1, Customer Edge A2 with a MAC address of MA2, and Customer Edge B1 with a MAC address of MB1) in the high latency memory.

In this way, memory resources may be conserved for provider edge devices that communicate directly with only root devices. Because root devices are permitted to communicate with both root devices and leaf devices within an Ethernet Tree, these provider edge devices need not perform a low latency lookup to determine whether to drop leaf-to-leaf communications (because these provider edge devices do not transmit information that originates from a leaf device). Furthermore, an Ethernet Tree service is used primarily for sending multicast traffic from a root device to multiple (e.g., all) leaf devices. Because of this, unicast communications between a root device to a leaf device are uncommon in an Ethernet Tree service. Since the quantity of leaf devices is typically large in an Ethernet Tree service, the provider edge device may conserve low latency memory resources by preventing route information for leaf devices from being stored in low latency memory. However, in some implementations, a provider edge device may store route information for leaf devices in a high latency memory, and may use the stored route information for unicast communications, as described in more detail elsewhere herein.

As indicated above, FIGS. 1A-1C are provided merely as an example. Other examples are possible and may differ from what was described with regard to FIGS. 1A-1C.

Figure 2:
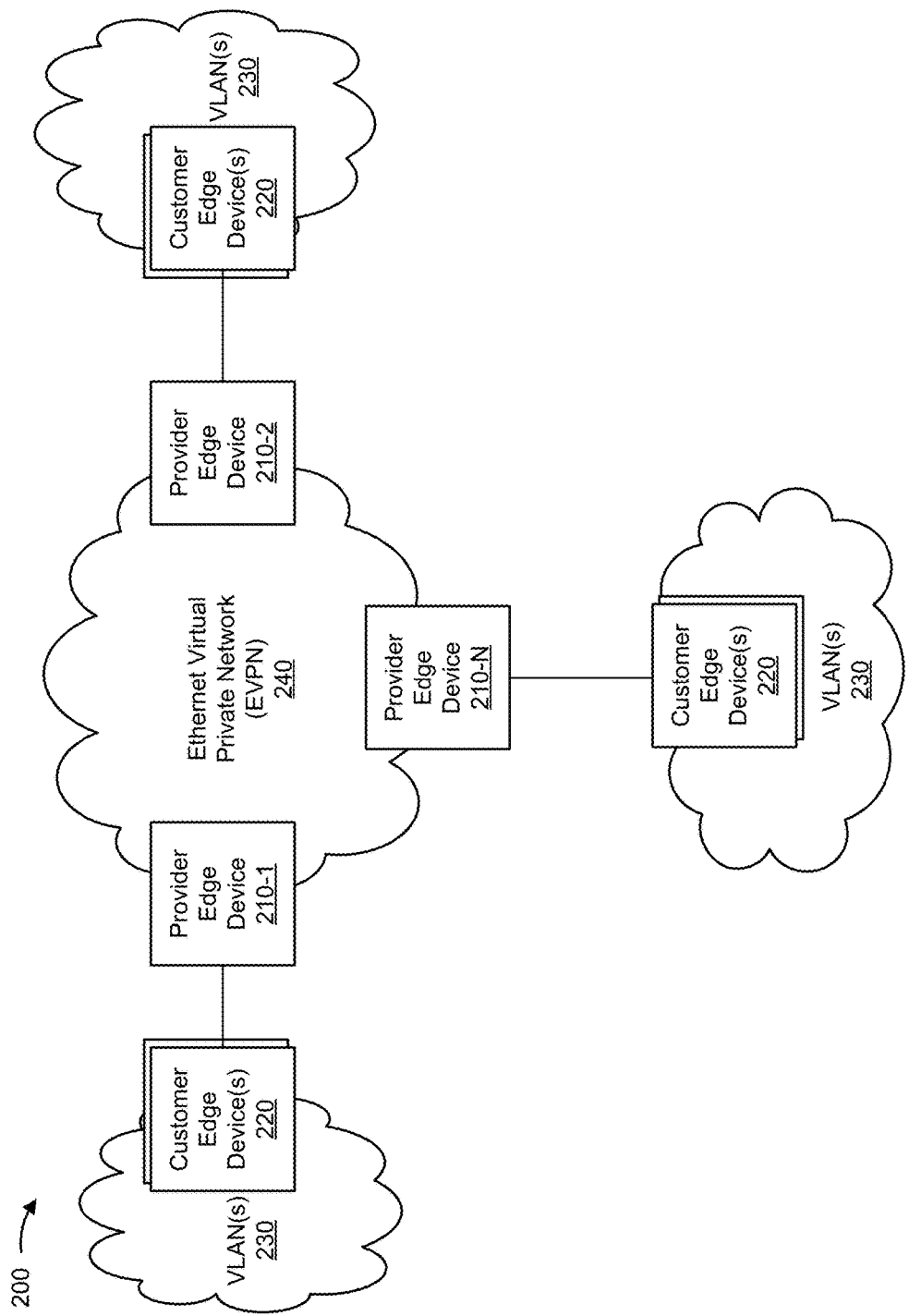
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of provider edge devices 210-1 through 210-N(N≥1) (hereinafter referred to collectively as "provider edge devices 210," and individually as "provider edge device 210"), a set of customer edge devices 220, a set of virtual local area networks (VLANs) 230, and an Ethernet Virtual Private Network (EVPN) 240. Devices of environment 200 may interconnect via wired connections, wireless connections, or a combination of wired and wireless connections.

Provider edge device 210 includes one or more network devices (e.g., one or more traffic transfer devices) capable of processing and transferring network traffic. For example, provider edge device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, provider edge device 210 may be located on an edge of a core network of a service provider (e.g., an Internet service provider), and may provide access to the core network. For example, provider edge device 210 may provide access, to the core network, to customer edge device 220 associated with a LAN of a customer (e.g., VLAN 230). Additionally, or alternatively, provider edge device 210 may communicate with one or more other provider edge devices 210 to permit communications between different customer edge devices 220 (and/or VLANs 230).

Customer edge device 220 includes one or more network devices (e.g., one or more traffic transfer devices) capable of processing and transferring network traffic. For example, customer edge device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, customer edge device 220 may be located on an edge of a customer premises, and may communicate with provider edge device 210 to gain access to a service provider's core network.

Additionally, or alternatively, customer edge device 220 may communicate with one or more endpoint devices via a LAN (e.g., VLAN 230) to provide the endpoint device(s) with access to the core network via customer edge device 220 and provider edge device 210.

VLAN 230 includes one or more wired and/or wireless networks. In some implementations VLAN 230 may include a virtual local area network. Additionally, or alternatively, VLAN 230 may include another type of LAN. In some implementations, endpoint devices associated with a customer may communicate with one another internally via VLAN 230. Additionally, or alternatively, the endpoint devices may communicate with external devices (e.g., not included in VLAN 230) via customer edge device 220 and provider edge device 210. While shown as being included in separate VLANs 230, customer edge devices 220 may be included in a single VLAN 230, in some implementations.

Ethernet VPN 240 includes a Layer 2 Virtual Private Network (VPN) that provides an Ethernet Tree service (e.g., a rooted multipoint service). In some implementations, Ethernet VPN 240 may be provisioned by a service provider to provide point-to-multipoint (e.g., multicast or broadcast) network traffic between endpoint devices (e.g., via provider edge devices 210 and customer edge devices 220). In an Ethernet Tree, a root device is typically a source for point-to-multipoint network traffic, while a leaf device is typically a destination for point-to-multipoint network traffic.

In some implementations, customer edge device 220 may be categorized as a root device or a leaf device in the Ethernet Tree. Additionally, or alternatively, an interface between customer edge device 220 and provider edge device 210 may be categorized as a root interface (e.g., where customer edge device(s) 220 that connect via the root interface are root devices) or a leaf interface (e.g., where customer edge device(s) 220 that connect via the leaf interface are leaf devices) in the Ethernet Tree. An interface between customer edge device 220 and provider edge device 210 may include, for example, a physical interface (e.g., a physical port) or a logical interface (e.g., a logical port), and may be referred to as a User-Network Interface (UNI) or an attachment circuit (AC).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
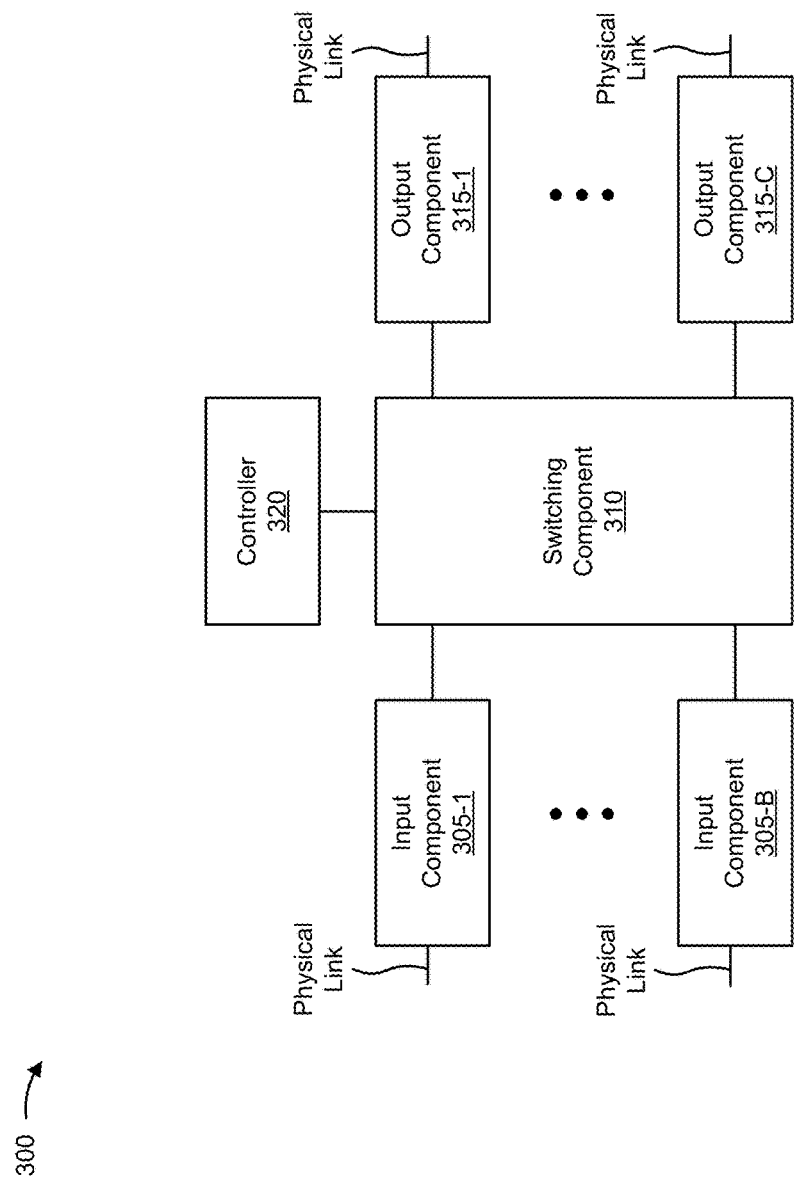
FIG. 3 is a diagram of example components of one or more devices of FIG. 2.

FIG. 3 is a diagram of example components of a device 300. Device 300 may correspond to provider edge device 210 and/or customer edge device 220. In some implementations, provider edge device 210 and/or customer edge device 220 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
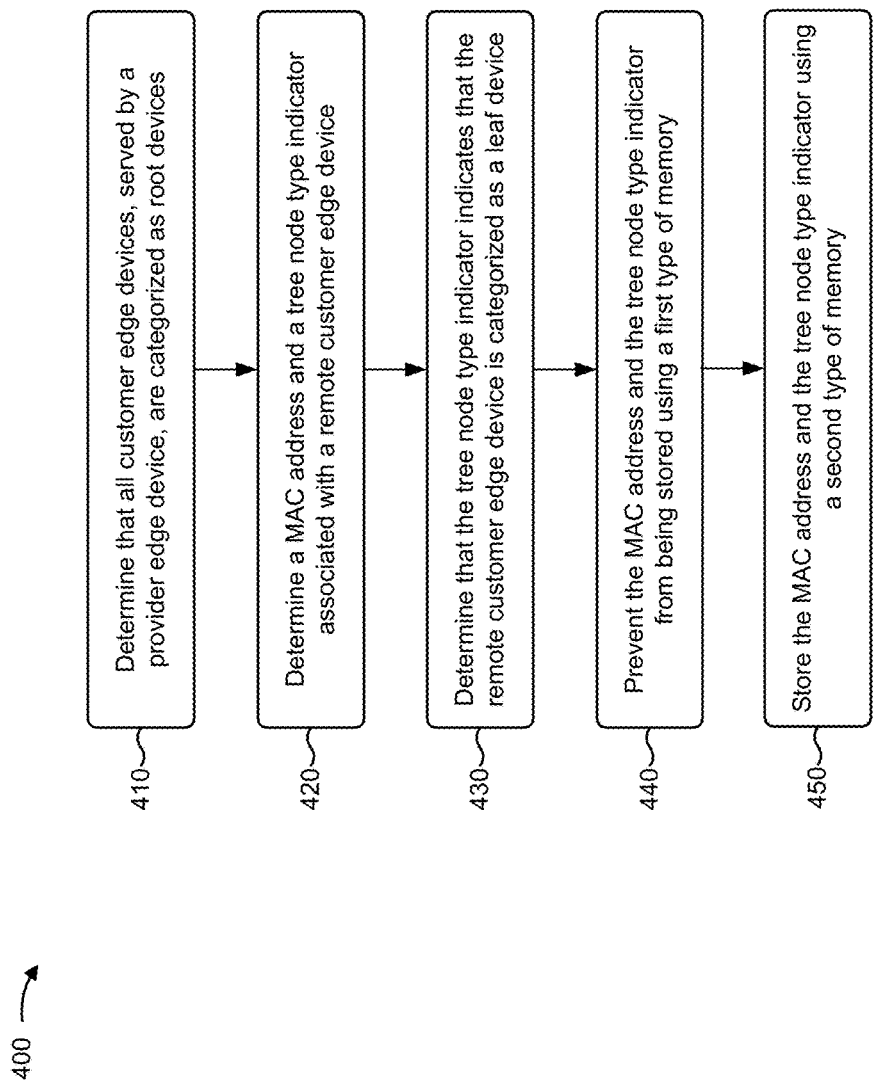
FIG. 4 is a flow chart of an example process for selectively storing route information in a first type of memory or a second type of memory of a provider edge device.

FIG. 4 is a flow chart of an example process 400 for selectively storing route information in a first type of memory or a second type of memory of a provider edge device. In some implementations, one or more process blocks of FIG. 4 may be performed by provider edge device 210. In some implementations, one or more process blocks of FIG. 4 may be performed by another device or a group of devices separate from or including provider edge device 210, such as customer edge device 220.

As shown in FIG. 4, process 400 may include determining that all customer edge devices, served by a provider edge device, are categorized as root devices (block 410). For example, provider edge device 210 may serve one or more customer edge device(s) 220 by providing the one or more customer edge devices 220 with access to a core network (e.g., EVPN 240). In some implementations, customer edge devices 220 served by provider edge device 210 (e.g., customer edge devices 220 that communicate directly with and/or connect directly to provider edge device 210) may be referred to as local customer edge devices 220. Conversely, customer edge devices 220 not served by provider edge device 210 (e.g., customer edge devices 220 that do not communicate directly with and/or that do not connect directly to provider edge device 210) may be referred to as remote customer edge devices 220.

In some implementations, customer edge device 220 may be associated with a tree node type indicator that indicates whether customer edge device 220 is a root device or a leaf device in an Ethernet Tree. In some implementations, provider edge device 210 may determine the tree node type identifier based on an interface via which network traffic is received from customer edge device 220. For example, when provider edge device 210 is provisioned to provide service to customer edge device 220 (e.g., to provider customer edge device 220 with access to a core network), provider edge device 210 may be configured (e.g., by an administrator, an operator, or a customer) to communicate with customer edge device 220 via one or more interfaces.

During the provisioning process, provider edge device 210 may store a tree node type indicator that indicates whether an interface and/or a customer edge device 220 is a root or a leaf in the Ethernet Tree. In some implementations, provider edge device 210 may store a tree node type indicator for each local customer edge device 220. In some implementations, provider edge device 210 may determine whether all local customer edge devices 220 are categorized as root devices based on these stored tree node type indicators (e.g., when all stored tree node type indicators indicate root devices).

Additionally, or alternatively, provider edge device 210 may determine whether all local customer edge devices 220 are categorized as root devices based on a configuration indicator stored by provider edge device 210. For example, the configuration indicator may indicate whether all local customer edge devices 220, served by provider edge device 210, are categorized as root devices. In some implementations, the configuration indicator may be stored based on provisioning provider edge device 210.

Additionally, or alternatively, provider edge device 210 may determine whether all local customer edge devices 220 are categorized as root devices based on analyzing the interfaces between provider edge device 210 and local customer edge devices 220 and/or based on querying local customer edge devices 220. When provider edge device 210 receives network traffic from a local customer edge device 220, provider edge device 210 may identify an interface via which the network traffic is received and/or may identify the local customer edge device 220 from which the traffic is received, and may look up the tree node type indicator based on the interface and/or the local customer edge device 220.

If provider edge device 210 determines that all local customer edge devices 220 are categorized as root devices, then provider edge device 210 may store some route information in high latency memory, to conserve low latency memory resources, as described in more detail below.

As further shown in FIG. 4, process 400 may include determining a MAC address and a tree node type indicator associated with a remote customer edge device (block 420). For example, provider edge device 210 may receive network traffic from a remote customer edge device 220 and/or may receive route information advertised by one or more other provider edge devices 210. Provider edge device 210 may determine a network address and/or a tree node type indicator associated with remote customer edge device 220 based on receiving the network traffic and/or the route information. The network address may include a Layer 2 address, such as a MAC address, in some implementations. While some implementations are described herein in connection with MAC addresses, other network addresses, such as Layer 3 addresses (e.g., IP addresses), may be used in addition to or as an alternative to MAC addresses, in some implementations.

As an example, when provider edge device 210 receives network traffic from remote customer edge device 220 (e.g., during authorization or authentication of remote customer edge device 220), provider edge device 210 may analyze the network traffic to determine a MAC address (or a range of MAC addresses) and a corresponding tree node type indicator associated with remote customer edge device 220. For example, the MAC address may identify remote customer edge device 220, or may identify an endpoint device within a LAN served by remote customer edge device 220. In some implementations, provider edge device 210 may determine the MAC address based on information included in the network traffic (e.g., included in a packet). As another example, when provider edge device 210 receives route information advertised by another provider edge device 210, the route information may include a MAC address and/or a tree node type indicator associated with remote customer edge device 220.

As further shown in FIG. 4, process 400 may include determining that the tree node type indicator indicates that the remote customer edge device is categorized as a leaf device (block 430), preventing the MAC address and the tree node type indicator from being stored using a first type of memory (block 440), and storing the MAC address and the tree node type indicator using a second type of memory (block 450). For example, based on the tree node type indicator, provider edge device 210 may determine that remote customer edge device 220 is categorized as a leaf device.

Based on determining that remote customer edge device 220 is categorized as a leaf device, provider edge device 210 may prevent route information, associated with remote customer edge device 220, from being stored in a first type of memory (e.g., a low latency memory) and/or may store the route information in a second type of memory (e.g., a high latency memory). The stored route information may include, for example, the MAC address, the tree node type indicator, or other route information associated with remote customer edge device 220, such as a next hop indicator that indicates an address of a network device (e.g., a provider edge device 210) to which network traffic is to be forwarded to reach remote customer edge device 220, an interface identifier that identifies an interface via which traffic is to be sent to reach remote customer edge device 220, a metric associated with routing the traffic, or the like.

Provider edge device 210 may include or be associated with two (or more) types of memory for storing route information. In some implementations, a first type of memory may include low latency memory and a second type of memory may include high latency memory. For example, the first type of memory may be associated with shorter (e.g., faster) access times than the second type of memory. In other words, provider edge device 210 may perform memory lookups and/or process network traffic using the first type of memory faster than performing memory lookups and/or processing network traffic using the second type of memory.

Additionally, or alternatively, the first type of memory may be located in closer physical proximity to switching component 310 and/or controller 320 of provider edge device 210 than the second type of memory. For example, the first type of memory may be included in switching component 310, and the second type of memory may be external to switching component 310. Additionally, or alternatively, the first type of memory may be local to provider edge device 210, and the second type of memory may be remote from provider edge device 210. Additionally, or alternatively, the first type of memory may be configured in hardware of provider edge device 210, and the second type of memory may be configured in software of provider edge device 210.

As an example, the first type of memory may include a hardware table, a hash table, or a content-addressable memory (CAM) (e.g., a binary CAM or a ternary CAM). As another example, the second type of memory may include a random access memory (RAM) (e.g., a static RAM).

In some implementations, provider edge device 210 may be able to process network traffic faster when route information is stored in the first type of memory as compared to the second type of memory. Additionally, or alternatively, provider edge device 210 may have a smaller amount of the first type of memory than the second type of memory. Therefore, packet processing may be faster when the first type of memory is reserved for important route information. In the case where provider edge device 210 communicates with only root devices, route information for leaf devices need not be stored in the first type of memory to prevent leaf-to-leaf communications because leaf-to-leaf communications will not occur when provider edge device 210 communicates only with root devices. Thus, provider edge device 210 may conserve resources of the first type of memory by preventing route information for leaf devices from being stored in the first type of memory, and/or by storing route information for leaf devices in the second type of memory. In some implementations, provider edge device 210 may store route information for root devices in the first type of memory.

In some implementations, provider edge device 210 may store route information in a Layer 2 data structure, such as a MAC address table. For example, provider edge device 210 may store a MAC address, in association with a tree node type indicator, in the Layer 2 data structure. Additionally, or alternatively, provider edge device 210 may store route information in another type of data structure, such as a routing table, a forwarding table, a flow table, or a virtual routing and forwarding (VRF) table.

By preventing route information associated with leaf devices from being stored in the first type of memory, provider edge device 210 may conserve memory resources of the first type of memory, which may have a smaller amount of available resources than a second type of memory. Furthermore, since an Ethernet Tree typically includes a large quantity of leaf devices as compared to the quantity of root devices, this conservation of memory resources may be significant.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
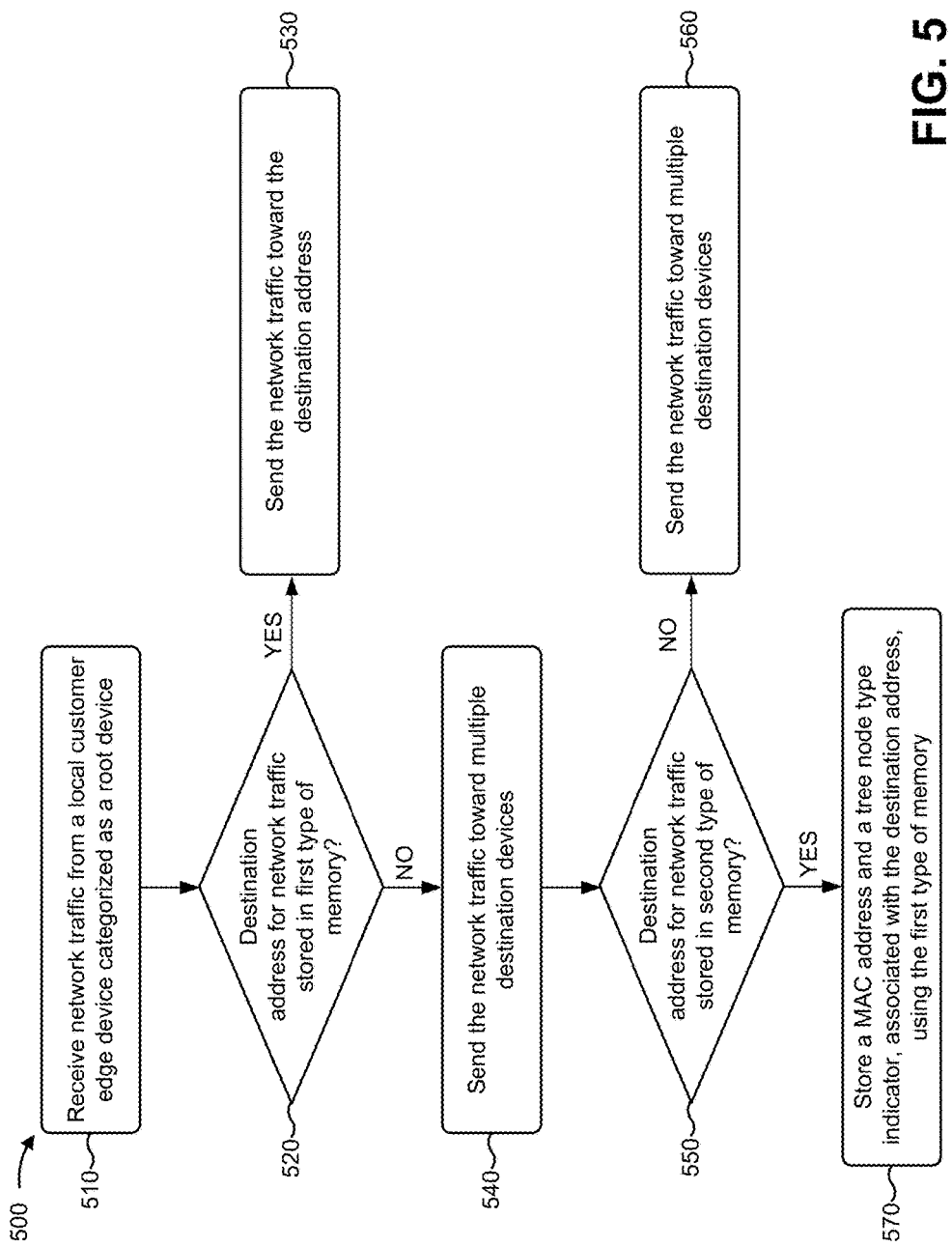
FIG. 5 is a flow chart of an example process for providing network traffic based on route information stored in a first type of memory or a second type of memory.

FIG. 5 is a flow chart of an example process 500 for providing network traffic based on route information stored in a first type of memory or a second type of memory. In some implementations, one or more process blocks of FIG. 5 may be performed by provider edge device 210. In some implementations, one or more process blocks of FIG. 5 may be performed by another device or a group of devices separate from or including provider edge device 210, such as customer edge device 220.

As shown in FIG. 5, process 500 may include receiving network traffic from a local customer edge device categorized as a root device (block 510), and determining whether a destination address, associated with the network traffic, is stored in a first type of memory (block 520). For example, provider edge device 210 may receive network traffic from a local customer edge device 220 that communicates directly with provider edge device 210. As described above in connection with FIG. 4, provider edge device 210 may communicate directly with only root devices. Thus, local customer edge device 220 may be categorized as a root device.

Provider edge device 210 may determine a destination associated with the network traffic. For example, the destination may be indicated in the network traffic by, for example, a destination address. The destination address may include a network address, such as a Layer 2 address (e.g., a MAC address). Provider edge device 210 may look up the destination address in the first type of memory to determine whether the destination address is stored in the first type of memory. The first type of memory is described in more detail above in connection with FIG. 4.

As further shown in FIG. 5, if the destination address is stored in the first type of memory (block 520—YES), then process 500 may include sending the network traffic toward the destination address (block 530). For example, if the destination address is stored in the first type of memory, then provider edge device 210 may send the network traffic toward the destination address (e.g., toward a device associated with the destination address). In some implementations, the destination address may be stored in the first type of memory in association with information that identifies a next hop for sending the traffic toward the destination address. In this case, provider edge device 210 may send (e.g., may route or forward) the network traffic to the next hop (e.g., a network device included in EVPN 240).

As further shown in FIG. 5, if the destination address is not stored in the first type of memory (block 520—NO), then process 500 may include sending the network traffic toward multiple destination devices (block 540). For example, if the destination address is not stored in the first type of memory, then provider edge device 210 may send the network traffic toward multiple destination devices. The multiple destination devices may include, for example, multiple endpoints associated with a set of customer edge devices 220 (e.g., a portion of customer edge devices 220 in EVPN 240 or all customer edge devices 220 in EVPN 240). The set of customer edge devices 220 may include, for example, customer edge devices 220 categorized as leaf devices (e.g., all customer edge devices 220, in EVPN 240, categorized as leaf devices) and/or customer edge devices 220 categorized as root devices (e.g., all customer edge devices 220, in EVPN 240, categorized as root devices, other than customer edge device 220 that sent the network traffic). As an example, provider edge device 210 may send the network traffic to all provider edge devices 210 (e.g., all next hops), in EVPN 240, for delivery to the endpoint devices via customer edge devices 220 served by the provider edge devices 210.

Because an Ethernet Tree service is typically used for point-to-multipoint traffic, provider edge device 210 performs an expected behavior (e.g., does not waste network resources) by sending the network traffic toward multiple endpoint devices. In some implementations, provider edge device 210 may look up the destination address in the second type of memory after or concurrently with sending the network traffic toward multiple destination devices, as described below.

As further shown in FIG. 5, process 500 may include determining whether the destination address, associated with the network traffic, is stored in a second type of memory (block 550). For example, provider edge device 210 may look up the destination address in the second type of memory to determine whether the destination address is stored in the second type of memory. In some implementations, provider edge device 210 may look up the destination address in the second type of memory after determining that the destination address is not stored in the first type of memory. The second type of memory is described in more detail above in connection with FIG. 4.

In some implementations, provider edge device 210 may determine whether the network traffic is unicast traffic (e.g., point-to-point traffic). If the network traffic is not unicast traffic (e.g., if the network traffic is point-to-multipoint traffic, such as multicast traffic or broadcast traffic), then provider edge device 210 may not look up the destination address in the second type of memory. In this case, provider edge device 210 may send the network traffic toward multiple endpoints, as described above in connection with block 540, because the network traffic is point-to-multipoint traffic.

If the network traffic is unicast traffic, then provider edge device 210 may look up the destination address in the second type of memory. When the network traffic is unicast traffic, then provider edge device 210 may waste network resources if provider edge device 210 sends the network traffic to multiple endpoint devices when the traffic is intended for a single endpoint device. Thus, when the network traffic is unicast traffic, provider edge device 210 may look up route information, associated with the destination address, stored in the second type of memory to conserve network resources, as described below.

In some implementations, provider edge device 210 may determine whether the network traffic is unicast traffic based on the destination address and/or the format of the destination address. For example, the destination address may be set to an address that indicates multicast traffic (e.g., an IP address with a prefix of 224.0.0.0/4) or broadcast traffic (e.g., an IP address of 255.255.255.255). If the destination address is not in a format that indicates multicast traffic or broadcast traffic, then provider edge device 210 may determine that the network traffic is unicast traffic.

As further shown in FIG. 5, if the destination address, associated with the network traffic, is not stored in the second type of memory (block 550—NO), then process 500 may include sending the network traffic toward multiple destination devices (block 560). For example, if the destination address is not stored in the second type of memory, then provider edge device 210 may continue to send the network traffic toward multiple endpoint devices, as described above in connection with block 540. In some implementations, if the network traffic is unicast traffic, then provider edge device 210 may receive a response to the network traffic. For example, provider edge device 210 may receive the response from an endpoint that is the intended destination for the unicast traffic, from a customer edge device 220 that serves the endpoint, or from another provider edge device 210 that serves the customer edge device 220. The response may include route information associated with the endpoint, the customer edge device 220, or the other provider edge device 210. In this case, provider edge device 210 may store the route information in the first type of memory to increase the speed of packet processing for the unicast traffic.

As further shown in FIG. 5, if the destination address, associated with the network traffic, is stored in the second type of memory (block 550—YES), then process 500 may include storing a MAC address and a tree node type indicator, associated with the destination address, using the first type of memory (block 570). For example, if the destination address is stored in the second type of memory, then provider edge device 210 may store route information, associated with the destination address, in the first type of memory. In some implementations, provider edge device 210 may copy the route information to the first type of memory, such that the route information is stored in both the first type of memory and the second type of memory. In some implementations, provider edge device 210 may move the route information from the second type of memory to the first type of memory, such that the route information is stored in only the first type of memory. In this way, provider edge device 210 may speed up packet processing for a unicast route currently being used to provide network traffic because future network traffic intended for the destination will be processed faster (e.g., because the route information is stored in the first type of memory).

In some implementations, provider edge device 210 may store the route information in the first type of memory only if the network traffic is unicast traffic because multicast or broadcast traffic may continue to be sent toward multiple endpoint devices. In this way, provider edge device 210 may conserve memory resources of the first type of memory. Additionally, or alternatively, provider edge device 210 may delete the route information from the first type of memory after expiration of a timer (e.g., if the route information is not used for a threshold amount of time). For example, provider edge device 210 may move the route information back to the second type of memory. In this way, provider edge device 210 may conserve memory resources of the first type of memory, while also conserving network resources by preventing flooding of unicast traffic to multiple endpoint devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein assist with conserving memory resources of provider edge devices. In particular, a provider edge device may include a first type of memory used to process network traffic more quickly than a second type of memory. Implementations described herein assist with conserving memory resources of the first type of memory.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A provider edge device comprising:
 a low latency memory;
 a high latency memory; and
 one or more processors to:
  determine whether all customer edge devices, served by the provider edge device, are categorized as root devices in an Ethernet Tree service provided by the provider edge device;
  receive route information associated with a remote customer edge device,
   the route information including a network address associated with the remote customer edge device;
  determine whether a tree node type indicator, associated with the remote customer edge device, indicates that the remote customer edge device is categorized as a leaf device in the Ethernet Tree service; and
  selectively store the route information in the low latency memory or the high latency memory based on determining whether all customer edge devices, served by the provider edge device, are categorized as root devices in the Ethernet Tree service and based on determining whether the tree node type indicator indicates that the remote customer edge device is categorized as a leaf device in the Ethernet Tree service,
   the route information being stored in the high latency memory based on:
    all customer edge devices, served by the provider edge device, being categorized as root devices in the Ethernet Tree service, and
    the remote customer edge device being categorized as a leaf device in the Ethernet Tree service, or
   the route information being stored in the low latency memory based on the remote customer edge device not being categorized as a leaf device in the Ethernet Tree service.

2. The provider edge device of claim 1, where the one or more processors are further to:
 receive network traffic from a local customer edge device,
  the network traffic indicating a destination address associated with the remote customer edge device;
 determine that the route information is not stored in the low latency memory; and
 send the network traffic toward multiple destinations, including the destination address associated with the remote customer edge device, based on determining that the route information is not stored using the low latency memory.

3. The provider edge device of claim 2, where the one or more processors are further to:
- determine that the route information is stored in the high latency memory; and
- store the route information in the low latency memory after determining that the route information is not stored in the low latency memory.

4. The provider edge device of claim 1, where the route information includes a media access control (MAC) address associated with the remote customer edge device.

5. The provider edge device of claim 1, where the one or more processors, when receiving the route information, are to:
- receive the route information from another provider edge device associated with providing the Ethernet Tree service.

6. The provider edge device of claim 1, where the one or more processors, when determining whether the tree node type indicator, associated with the remote customer edge device, indicates that the remote customer edge device is categorized as a leaf device in the Ethernet Tree service, are to:
- determine that the tree node type indicator, associated with the remote customer edge device, indicates that the remote customer edge device is categorized as a leaf device in the Ethernet Tree service; and
- where the one or more processors are further to:
  - prevent the route information from being stored in the low latency memory based on determining that the tree node type indicator, associated with the remote customer edge device, indicates that the remote customer edge device is categorized as a leaf device in the Ethernet Tree service.

7. The provider edge device of claim 1, where the one or more processors are further to:
- receive network traffic from a local customer edge device, the network traffic indicating a destination address associated with the remote customer edge device;
- determine that the destination address is not stored in the low latency memory; and
- send the network traffic toward multiple destinations, including the destination address, based on determining that the destination address is not stored using the low latency memory.

8. A non-transitory computer-readable medium storing instructions, the instructions comprising:
- one or more instructions that, when executed by one or more processors of a first network device, cause the one or more processors to:
  - determine whether all network devices, served by the first network device, are categorized as root devices in an Ethernet Tree service provided by the first network device;
  - receive route information associated with a second network device;
  - determine whether the second network device is categorized as a leaf device in the Ethernet Tree service; and
  - selectively store the route information in a first type of memory or a second type of memory based on determining whether all network devices, served by the first network device, are categorized as root devices in the Ethernet Tree service and based on determining whether the second network device is categorized as a leaf device in the Ethernet Tree service,
  - the route information being stored in the second type of memory based on:
    - all network devices, served by the first network device, being categorized as root devices in the Ethernet Tree service, and
    - the second network device being categorized as a leaf device in the Ethernet Tree service, or
  - the route information being stored in the first type of memory based on the second network device not being categorized as a leaf device in the Ethernet Tree service.

9. The non-transitory computer-readable medium of claim 8, where the first type of memory is associated with a shorter access time than the second type of memory.

10. The non-transitory computer-readable medium of claim 8, where the first type of memory includes at least one of:
- a hardware table,
- a hash table, or
- a content-addressable memory.

11. The non-transitory computer-readable medium of claim 8, where the second type of memory includes a random access memory.

12. The non-transitory computer-readable medium of claim 8, where the one or more instructions, when executed by the one or more processors, further cause the one or more processors to:
- receive unicast traffic associated with the second network device; and
- store the route information using the first type of memory based on receiving the unicast traffic associated with the second network device.

13. The non-transitory computer-readable medium of claim 8, where the route information includes a network address associated with the second network device.

14. The non-transitory computer-readable medium of claim 8, where the route information is first route information; and
- where the one or more instructions, when executed by the one or more processors, further cause the one or more processors to:
  - receive network traffic from the second network device, the network traffic indicating a destination address associated with the second network device;
  - determine that the destination address is stored in the second type of memory; and
  - store second route information, associated with the destination address, in the first type of memory based on determining that the destination address is stored in the second type of memory.

15. A method, comprising:
- determining, by a provider edge device, whether all customer edge devices, served by a provider edge device, are categorized as root devices in an Ethernet Tree service provided by the provider edge device;
- determining, by the provider edge device, a network address associated with a remote customer edge device;
- determining, by the provider edge device, whether the remote customer edge device is categorized as a leaf device in the Ethernet Tree service; and
- selectively storing, by the provider edge device, the network address in a first type of memory or a second type of memory based on determining whether all network devices, served by the provider edge device, are categorized as root devices in the Ethernet Tree service and based on determining whether the remote customer edge device is categorized as a leaf device in the Ethernet Tree service, the network address being stored in the second type of memory based on:

determining that all customer edge devices, directly served by the provider edge device, are categorized as root devices in the Ethernet Tree service; and determining that the remote customer edge device is categorized as a leaf device in the Ethernet Tree service, or the network address being stored in the first type of memory based on the remote customer edge device not being categorized as a leaf device in the Ethernet Tree service.

16. The method of claim 15, where the first type of memory is associated with a shorter access time than the second type of memory.

17. The method of claim 15, where the first type of memory includes at least one of:

a hardware table, a hash table, or a content-addressable memory; and where the second type of memory includes a random access memory.

18. The method of claim 15, where the remote customer edge device is not directly served by the provider edge device.

19. The method of claim 15, further comprising:

receiving unicast traffic associated with the remote customer edge device after selectively storing the network address in the first type of memory or the second type of memory; and storing the network address in the first type of memory based on receiving the unicast traffic associated with the remote customer edge device.

20. The method of claim 15, where determining whether the remote customer edge device is categorized as a leaf device in the Ethernet Tree service includes:

determining whether the remote customer edge device is categorized as a leaf device in the Ethernet Tree service based on a configuration indicator stored by the provider edge device.

* * * * *